Patented July 3, 1951

2,559,061

UNITED STATES PATENT OFFICE 2,559,061

PHENYLCYANAMIDES AND METHODS FOR OBTAINING THE SAME

Clarence Kenneth Banks and John Controulis, Detroit, Mich., assignors to Parke, Davis & Company, Detroit, Mich., a corporation of Michigan No Drawing. Application July 15, 1946, Serial No. 683,784

4 Claims. (Cl. 260—440)

This invention relates to phenylcyanamides and to methods for obtaining the same. More particularly, the invention relates to phenylcyanamides substituted in the para position of the phenyl ring by an arsenic containing radical and to water-soluble salts of the same. These new cyanamides have the formula,

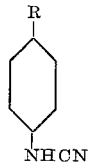

where R is an arsonic acid radical, an arsenoxide radical or its hydrate, —As(halogen)$_2$ or a substituted thioarsenite radical such as a

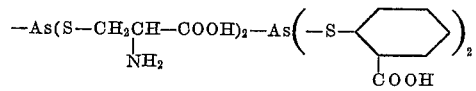

and the like.

In accordance with the invention p-arsanilic acid or a partially neutralized alkali or alkaline earth metal salt thereof is treated with a cyanogen halide in aqueous solution to produce 4-cyanamidobenzenearsonic acid. By reduction of 4-cyanamidobenzenearsonic acid in an appropriate media, the corresponding arsenoso compound is obtained. The derivatives of the arsenoso compound, hydrated 4-cyanamidobenzenearsonous oxide, are prepared by means well-known to those skilled in the art. For example, the oxide is produced by simply heating the hydrate in vacuo. This oxide or its hydrate may then be converted to a hydrohalide salt of a 4-cyanamidobenzenearsonous halide by treatment with a halogen acid such as hydrochloric acid. On treatment of the oxide or hydrate with an aqueous solution of an alkali metal salt of athiosubstituted organic acid, a substituted thioarsenite derivative is obtained.

All the new compounds of the present invention form water-soluble acid addition salts such as the hydrochloride, hydrobromide, hydroiodide, sulfate, sulfamate and phosphate salts. The compounds which also contain an acid group such as a carboxyl group or an arsonic acid group also form well-defined, water-soluble metal and ammonium salts with alkalies, ammonia and amines. Some examples of the alkaline reagents which may be used in preparing these latter salts are sodium hydroxide, potassium hydroxide, lithium hydroxide, sodium carbonate, potassium carbonate, ammonium hydroxide, aqueous methyl amine, aqueous diethylamine and the like.

These compounds are useful antiprotozoal agents and find particular use in the treatment of amebic dysentery. They are also useful as intermediates in the synthesis of other compounds.

The invention is illustrated by the following examples.

*Example 1.—4-Cyanamidobenzenearsonic acid*

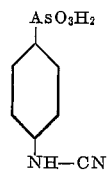

(a) 217 g. of p-arsanilic acid is dissolved in one liter of water containing 40 g. of sodium hydroxide and the resulting solution treated with an aqueous solution containing 120 g. of cyanogen bromide keeping the temperature below 25° C. The solution is allowed to stand overnight and the product which crystallizes out removed by filtration and dried in vacuo over phosphorus pentoxide. The product is sufficiently pure for most purposes but if desired it may be purified further by dissolving the crystals in a minimum of hot water, treating the hot solution with charcoal, filtering while hot and chilling the filtrate. The purified 4-cyanamidobenzenearsonic acid crystallizes as colorless needles which have an indefinite melting point.

4-cyanamidobenzenearsonic acid is a colorless, crystalline solid, soluble in hydrochloric, sulfuric and other mineral acids, aqueous soutions of sodium or potassium hydroxides, ammonia water and aqueous solutions of organic amines.

The structure of the product can be proven by hydrolysis in mild alkaline solution to p-carbamidobenzenearsonic acid.

The above process may be modified as to quantities and reactants. Atoxyl, the sodium salt of p-arsanilic acid, may be substituted for the p-arsanilic acid and sodium hydroxide, cyanogen chloride or iodide may be substituted for the bromide. Other salts of p-arsanilic acid may also be employed, such as the potassium or magnesium salts.

The sodium salt of 4-cyanamidobenzenearsonic acid may be obtained as follows:

24.2 g. of 4-cyanamidobenzenearsonic acid is dissolved in 20 cc. of water containing 4 g. of sodium hydroxide. After clarifying by filtration, the solution is treated with 9 volumes of alcohol to yield nearly a theoretical amount of sodium 4-cyanamidobenzenearsonate, a white crystalline solid, readily soluble in water. If the amount of sodium hydroxide is doubled, the disodium salt is obtained.

24.2 g. of 4-cyanamidobenzenearsonic acid is dissolved in alcohol containing a slight excess of gaseous hydrogen chloride. On dilution of the solution with ether, the hydrochloride salt of 4-cyanamidobenzenearsonic acid separates as a finely divided, white powder.

The ammonium salt of 4-cyanamidobenzenearsonic acid is obtained by dissolving the product in alcohol and bubbling a slight excess of gaseous ammonia into the solution. The alcohol is removed in vacuo to obtain the ammonium salt as a white powder.

(b) 217 g. of p-arsanilic acid is dissolved in water containing one equivalent of sodium hydroxide and the pH of the solution adjusted to 6 with acetic acid. A solution of 75 g. of potassium cyanide in water is treated with bromine until a faint trace of bromine remains. The two solutions are mixed and allowed to stand overnight during which period the product crystallizes out. The crude product may be purified as described in (a) above.

*Example 2.—4-cyanamidobenzenearsonous oxide and hydrate*

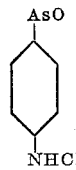
4-cyanamidobenzene arsonous oxide

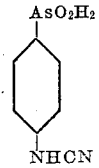
4-cyanamidobenzene arsonous oxide hydrate (a) 10 g. of 4-cyanamidobenzenearsonic acid is suspended in 150 cc. of 4 N hydrochloric acid and 0.3 g. of potassium iodide added. The mixture is saturated with sulfur dioxide for two hours with cooling in an ice bath and then filtered. The white product remaining on the filter, 4-cyanamidobenzenearsonous oxide hydrate, is washed with water and dried in vacuo at room temperature.

The hydrochloride salt is prepared by dissolving the product in alcohol and treating the solution with an alcoholic solution containing exactly one equivalent of gaseous hydrogen chloride. Ether is added to the solution and the white product which separates collected and dried at room temperature under slightly reduced pressure.

(b) 10 g. of 4-cyanamidobenzenearsonous oxide hydrate is heated in vacuo at 110° C. for several hours and the material cooled while in vacuo. The white solid remaining consists of 4-cyanamidobenzenearsonous oxide.

The hydrochloride salt of the oxide is most conveniently prepared by drying the hydrochloride salt of the hydrate (prepared as in (a) above) at 110° C. in vacuo.

*Example 3.—4-[di-(carboxymethylenethio)-arsino]phenylcyanamide*

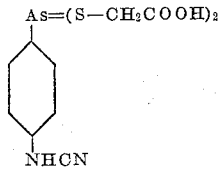

22.6 g. of the hydrate of 4-cyanamidobenzenearsonous oxide is stirred with two equivalents of sodium thioglycollate in 200 cc. of water. When the arsenical has dissolved, the solution is filtered and the disodium 4-[di-(carboxymethylenethio)arsino]phenylcyanamide precipitated with nine volumes of alcohol. The white product is collected by filtration and dried at room temperature under slightly reduced pressure.

If desired, the product may be isolated as the free acid by acidifying the aqueous solution of the sodium salt with acetic acid. The 4-[di-(carboxymethylenethio)arsino]phenylcyanamide which precipitates is collected, washed with a small amount of water and dried.

The hydrochloride salt of 4-[di-(carboxymethylenethio)arsino]phenylcyanamide is prepared by dissolving the free acid in alcohol and treating the resulting solution with an alcoholic solution containing one equivalent of dry gaseous hydrogen chloride. The salt is precipitated by the addition of several volumes of ether and the precipitated product collected and dried.

*Example 4.—4-[di-(β-carboxy-β-aminoethylthio)arsino]phenylcyanamide*

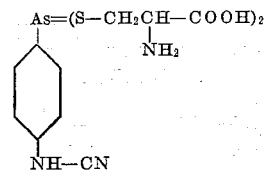

22.6 g. of the hydrate of 4-cyanamidobenzenearsonous oxide is stirred with two equivalents of the sodium salt of cysteine in 200 cc. of water until the arsenical dissolves. The solution is filtered and the disodium 4-[di-(β-carboxy-β-aminoethylthio)arsino]phenylcyanamide precipitated by adding about ten volumes of alcohol to the solution. The white product is collected and dried in vacuo.

*Example 5.—4-cyanamidobenzenearsonous chloride hydrochloride*

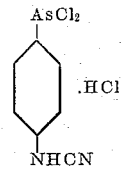

20.7 g. of 4-cyanamidobenzenearsonous oxide is dissolved in 100 ml. of water containing one equivalent of hydrochloric acid, the solution chilled and diluted to three volumes with concentrated hydrochloric acid. The white crystalline hydrochloride salt of 4-cyanamidobenzenearsonous chloride which separates is collected and dried in vacuo.

*Example 6.—4-cyanamidobenzenearsonous bromide hydrobromide*

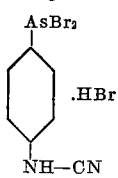

20.7 g. of 4-cyanamidobenzenearsonous oxide is dissolved in 100 ml. of water containing one equivalent of hydrobromic acid, the solution chilled and diluted to three volumes with constant boiling hydrobromic acid. The white crystalline hydrobromide salt of 4-cyanamidobenzenearsonous bromide which separates from the solution is collected and dried at room temperature under slightly reduced pressure.

In a similar manner one may prepare the hydroiodide salt of 4-cyanamidobenzenearsonous iodide by using hydriodic acid instead of hydrobromic acid. When preparing the iodide it is usually not necessary to dilute the solution with concentrated hydriodic acid as the desired reaction takes place merely on dissolving the oxide in strong hydroiodic acid.

The free bases of the compounds of this example and of Example 5 are unstable and on neutralization of the acid addition salt with alkali the hydrate of 4-cyanamidobenzenearsonous oxide is produced.

What we claim as our invention is:

1. A compound of formula $R.C_6H_4.NHCN$ where R is an arsenic-containing radical of the class consisting of AsO, $As(OH)_2$, $As(Hal)_2$, $AsO_3HM$ and $AsO_3M_2$, M representing alkali metal and Hal representing halogen, and water-soluble salts of said compound.

2. A compound of the formula,

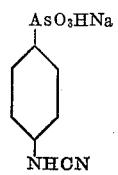

3. A compound of the formula,

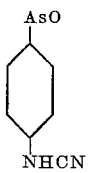

4. A compound of the formula,

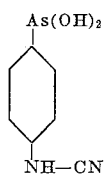

CLARENCE KENNETH BANKS.
JOHN CONTROULIS.

REFERENCES CITED

The following references are of record in the file of this patent:

UNITED STATES PATENTS

| Number | Name | Date |
|---|---|---|
| Re. 16,921 | Kharasch | Apr. 3, 1928 |
| 1,002,243 | Ehrlich et al. | Sept. 5, 1911 |
| 1,622,271 | Benda | May 29, 1927 |
| 1,677,392 | Kharasch | July 17, 1928 |
| 1,677,964 | Fourneau | July 24, 1928 |
| 2,331,833 | Hamilton | Oct. 12, 1943 |

FOREIGN PATENTS

| Number | Country | Date |
|---|---|---|
| 27,330 | France (Addition to 556,366) | June 6, 1924 |
| 293,152 | Great Britain | July 5, 1928 |
| 680,888 | Germany | Sept. 12, 1939 |

OTHER REFERENCES

Sticklings: Jour. Chem. Soc. (London), vol. 1928, pages 3131 to 3134.